United States Patent
Edelman et al.

(10) Patent No.: US 7,240,077 B1
(45) Date of Patent: Jul. 3, 2007

(54) WEB SITE CONTENT CHANGE MANAGEMENT

(75) Inventors: Alexandre Edelman, Seattle, WA (US); Gus Lopez, Seattle, WA (US); Douglas Treder, Shoreline, WA (US)

(73) Assignee: Amazon.com, Inc., Seattle, WA (US)

( * ) Notice: Subject to any disclaimer, the term of this patent is extended or adjusted under 35 U.S.C. 154(b) by 463 days.

(21) Appl. No.: 10/335,222

(22) Filed: Dec. 30, 2002

(51) Int. Cl.
G06F 12/12 (2006.01)

(52) U.S. Cl. .................. 707/203; 707/102; 707/10

(58) Field of Classification Search ........... 707/103 R, 707/203, 10; 705/9
See application file for complete search history.

(56) References Cited

U.S. PATENT DOCUMENTS

| | | | |
|---|---|---|---|
| 6,038,601 A * | 3/2000 | Lambert et al. ............ | 709/226 |
| 6,199,204 B1 | 3/2001 | Donohue | |
| 6,256,773 B1 * | 7/2001 | Bowman-Amuah ......... | 717/121 |
| 6,356,903 B1 * | 3/2002 | Baxter et al. ................. | 707/10 |
| 6,505,212 B2 | 1/2003 | Nakano | |
| 6,596,030 B2 | 7/2003 | Ball et al. | |
| 2002/0046244 A1 * | 4/2002 | Bimson et al. ............. | 709/205 |
| 2002/0194194 A1 * | 12/2002 | Fenton .................... | 707/104.1 |
| 2002/0198878 A1 * | 12/2002 | Baxter et al. ................. | 707/6 |

OTHER PUBLICATIONS

Susan Dart, Content Change Management: Problems for Web Systems, 1999, Springer-Verlag, Lecture Notes In Computer Science; Vol. 1675, Proceedings of the 9th International Symposium on System Configuration Management, ISBN:3-540-66484-X, pp. 1-16.*

Serena Software, Inc., "ChangeMan WCM, Technical Overview: Code and Content Change Management for Web Applications," Copyright 2001 (16 pages).

Gauss, "VIP Content Manager," Copyright 2002 Gauss Interprises, Inc. (4 pages).

Interwoven Products—Product Suite Overview (2 pages) http://www.interwoven.com/cgi-bin/printable_page.cgi [Accessed Sep. 18, 2002].

Interwoven Open Deploy, Technical Overview—Version 1.0, Copyright 2001 Interwoven, Inc. (7 pages).

Interwoven Web Page Templating—Version 2.0, Copyright 2000 Interwoven, Inc. (8 pages).

Openpages 4.0—An Adaptive Process Platform, An Openpages White Paper, Aug. 2002 (19 pages).

Percussion, Rhythmyx Content Manager, Rhythmyx Content Management System Key Features, Copyright 2002 (4 pages) http://www.percussion.com/rhythmyx/keyfeatures.htm [Accessed Sep. 25, 2002].

(Continued)

*Primary Examiner*—Paul Rodriguez
*Assistant Examiner*—Luke Osborne
(74) *Attorney, Agent, or Firm*—Perkins Coie LLP

(57) ABSTRACT

A facility for specifying and previewing changes to a web site is described. Sets of changes to a web site are scheduled for release at a specified time. While the changes are being specified using a tool/interface, methods for showing the change as it will appear on the live web site are implemented. Inconsistencies between specified changes and changes in future releases may be identified as the changes are specified. Web page preview functionality is provided to allow any release to be viewed before publication to a live web site. The preview further allows inconsistencies between selected changes and changes in other future releases to be identified.

49 Claims, 12 Drawing Sheets

OTHER PUBLICATIONS

PIRONET NDH, Content Life Cycle, Copyright 2002 by PIRONET NDH AG (2 pages) http://www.pironet-ndh.com/servlet/PB/menu/1002873/index.html [Accessed Sep. 25, 2002].

PIRONET NDH, Architecture and Technology, Copyright 2002 by PIRONET NDH AG (3 pages) http://www.pironet-ndh.com/servlet/PB/menu/1002786/index.html [Accessed Sep. 25, 2002].

Rational: The Software Development Company, Unifying Code and Content Management for e-Business, Rational Suite ContentStudio, "Unify Code and Content Management for Web Development," Copyright 2002 Rational Software Company (3 pages) http://www.rational.com/products/cstudio/index.jsp [Accessed Sep. 25, 2002].

Roxen CMS (3 pages) http://www.roxen.com/page/103/139/html [Accessed Sep. 25, 2002].

Stellent Content Management, Copyright 2002 Stellent, Inc. (2 pages) http://www.stellent.com/intradoc-cgi-/nph-idc_cgi.exe?IdcService=GET_DYNAMIC_CONV [Accessed Sep. 30, 2002].

Rogers, Bill, "Ektron White Paper: Ektrons's Unique Component-Based Approach to Content Management," Copyright 2002, Ektron, Inc. (15 pages).

Forrester Research—TechRankings Scorecard Reprint, Copyright 1997-2002 Forrester Research, Inc. (3 pages) http;//www.forrester.com/TechRankings/Reprints/divine.html [Accessed Sep. 24, 2002].

divine—Content Server—Overview, Copyright 2002 divine, inc. (2 pages) http;//www.divine.com/servlet/ContentServer?/pagename=d3%2Fpage%sFd3SubSectionWR [Accessed Sep. 24, 2002].

Content Management: At the Center of e-Business, An Executive White Paper, Jul. 2001 (10 pages).

Merant Collage Overview, Copyright 2002 Merant (6 pages).

Mediasurface—Enterprise Web Content Management is the Heart of e-Business, Content Creation and Management (5 pages) http://www.mediasurface.com/productsection/functionality/contentcreation?version=1 [Accessed Sep. 24, 2002].

Vignette V6 Content Suite Overview, Copyright 1996-2002 Vignette Corporation (2 pages) http://www.vignette.com/CDA/PrintVersion/0, 4152,2215,00.html.

Tridion Content Manager (2 pages), no date.

BroadVision One-to-One Content, Copyright 2001 BroadVision, Inc. (4 pages).

Site Executive, The Easiest and Most Extensible Content Manager on the Web, Systems Alliance, Copyright 2002 Systems Alliance Incorporated (2 pages) http://www.systemsalliance.com/Products/index.html [Accessed Sep. 30, 2002].

FatWire Software, Products, UpdateEngine 6, Copyright 2002 FatWire Corporation (3 pages) http://www.fatwire.com/products/UE6.html [Accessed Sep. 24, 2002].

FatWire Software, UpdateEngine6, Products, Out-of-the-box Functionality, Copyright 2002 FatWire Corporation (2 pages0 http://www.fatwire.com/products/ootb.html [Accessed Sep. 24, 2002].

FileNET Web Content Management, Copyright FileNET Corporation 2002 (2 pages) http://www.filenet.com/English/Products/WCM/020810012.asp [Accessed Sep. 24, 2002].

FileNET Web Content Management, White Paper: Selecting a Web Content Management System, Apr. 2002 (17 pages).

FileNET Web Content Management, White Paper: Workflow & Web Content Management, Apr. 2002 (7 pages).

Microsoft Content Management Server 2001, Fast Facts, Copyright 2001 Microsoft Corporation (1 page).

Microsoft Content Management Server—Product Overview, Copyright 2002 Microsoft Corporation (2 pages) http://www.microsoft.com/cmserver/evaluation/overview.htm [Accessed Sep. 30, 2002].

Microsoft Content Manager Server—Features, Copyright 2002 Microsoft Corporation (2 pages) http://www.microsoft.com/cmserver/evaluation/features.htm [Accessed Sep. 30, 2002].

Microsoft Content Management Server—CMS Workflow, Content Management Server 2001 Workflow, Jul. 6, 2001 (2 pages) http://www.microsoft.com/cmserver/evaluation/cmsworkflow_wp.htm [Accessed Sep. 30, 2002].

Microsoft Content Management Server 2001, Content Management Server 2001 Workflow, Detailed Feature Description, Published: Jul. 2001 (11 pages).

RedDot Solutions/Key Features, Copyright 2002 RedDot Solutions (13 pages) http://www.reddotsolutions.com/products/keyfeatures_arc.htm [Acessed Sep. 25, 2002].

* cited by examiner

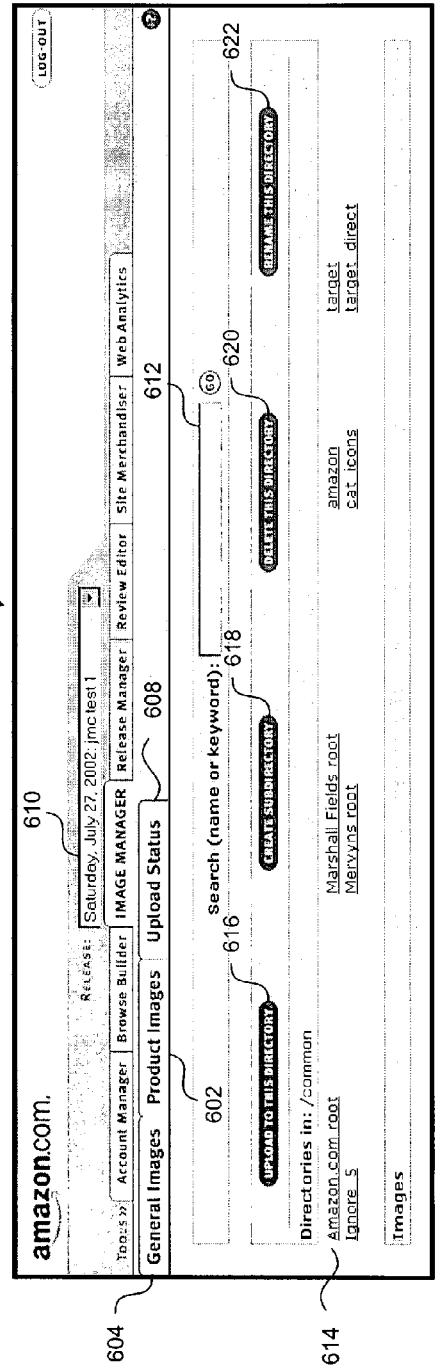
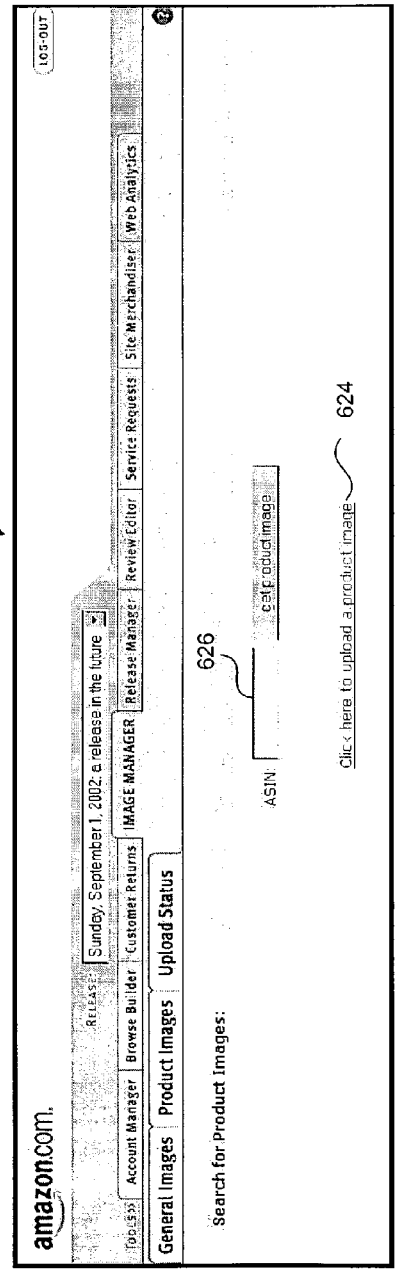

FIG. 11

WEB SITE CONTENT CHANGE MANAGEMENT

TECHNICAL FIELD

This application relates generally to specifying content for web sites and to managing changes of web site content.

BACKGROUND

The Internet comprises a vast number of computers and computer networks that are interconnected through communication channels. Because it facilitates electronic communications between vendors and purchasers, the Internet is increasingly being used to conduct "electronic commerce." Electronic commerce refers generally to commercial transactions that are at least partially conducted using the computer systems of the parties to the transactions. For example, a purchaser can use a personal computer to connect via the Internet to a vendor's computer. The purchaser can then interact with the vendor's computer to conduct the transaction. Although many of the commercial transactions that are performed today could be performed via electronic commerce, the acceptance and widespread use of electronic commerce depends, in large part, upon the ease-of-use of conducting such electronic commerce. If electronic commerce can be easily conducted, then even the novice computer user will choose to engage in electronic commerce. Therefore, it is important that techniques be developed to facilitate conducting electronic commerce.

One of the fundamental aspects of electronic commerce is creation and maintenance of a useful web site through which vendors and buyers can carry out transactions. Typically, this type of web site allows vendors to display product information (e.g., product descriptions, price information, product images) and allows customers to browse for products and place and confirm orders. It may also allow customers to provide product review information and may be dynamically tailored to provide custom content for individual customers. Initially creating this type of web site can be complicated, costly and time-consuming. As with the display of physical products in a store, it is important that product information on a web site be well organized and attractively displayed so customers can easily find what they are looking for. Likewise, it is desirable to provide a system for obtaining purchase information from customers in a simple and efficient way. Once the web site is initially created, it is important that the web site is updated as new products are offered for sale and old products are sold out or discontinued. Special sales or promotions may also call for changes to the web site.

Making changes to a web site often involves careful planning to avoid inconsistencies in information presented on the site at any given time. This is especially true in the case where more than one person is authorized to update or change a web site's content. Accordingly, such changes are typically prepared in advance and then scheduled for release or publication to the live web site at a specified time. To assure quality, systems that have been developed to help vendors create and maintain web sites (i.e., content management systems) may incorporate a workflow process so that a manager can review and approve/disapprove content changes prior to release. However, review of content changes can be tedious and complex, especially when the practice of preparing releases in advance of the actual release date results in the accumulation of multiple scheduled but unreleased changes.

Where multiple unreleased changes accumulate, it is likely that changes in one scheduled release may affect changes in another scheduled release, eventually causing significant problems on the live web site. For example, a release scheduled for the fifth day of the month may delete a "toys" browse directory, and a release scheduled for the sixth day of the month may attempt to add a new child browse directory (e.g., a "dolls" browse directory) to the "toys" browse directory (which will no longer exist by the time the release is published to the live web site). Unless the problem is identified, the missing browse directory will cause errors in the live web site upon publication of the two releases. Additionally, when creating new releases, an accumulation of unreleased changes may make it difficult to visualize the effect of further changes to subsequent releases. For example, a live web site may currently advertise a sale on sweaters by displaying an image of a man's sweater along with the text "FIFTEEN PERCENT OFF ALL FALL SWEATERS." A release scheduled for the fourth day of the month may change the image of the sweater to an image of a woman model wearing a sweater. Relying on the man's sweater image currently published on the live web site, a user creates a release scheduled for the eighth of the month and changes the text to "FALL MEN'S SWEATER SALE" without changing the associated image. Unless this problem is somehow identified prior to release, the live web site will at some point contain conflicting information that may confuse or turn-away customers.

It would be desirable to have a method and associated system for preventing inconsistencies in changes to web sites, both at the time that the changes are being created and at the time the changes are being reviewed prior to release.

BRIEF DESCRIPTION OF THE DRAWINGS

FIGS. 6A and 6B are display diagrams showing examples of an image manager tool/interface for organizing and uploading web site images ranging from web site graphics to individual product images.

FIG. 11 is a display diagram showing an example of a web page preview for a change selected from the release report of FIG. 10.

DETAILED DESCRIPTION

I. Introduction

Figure 1:
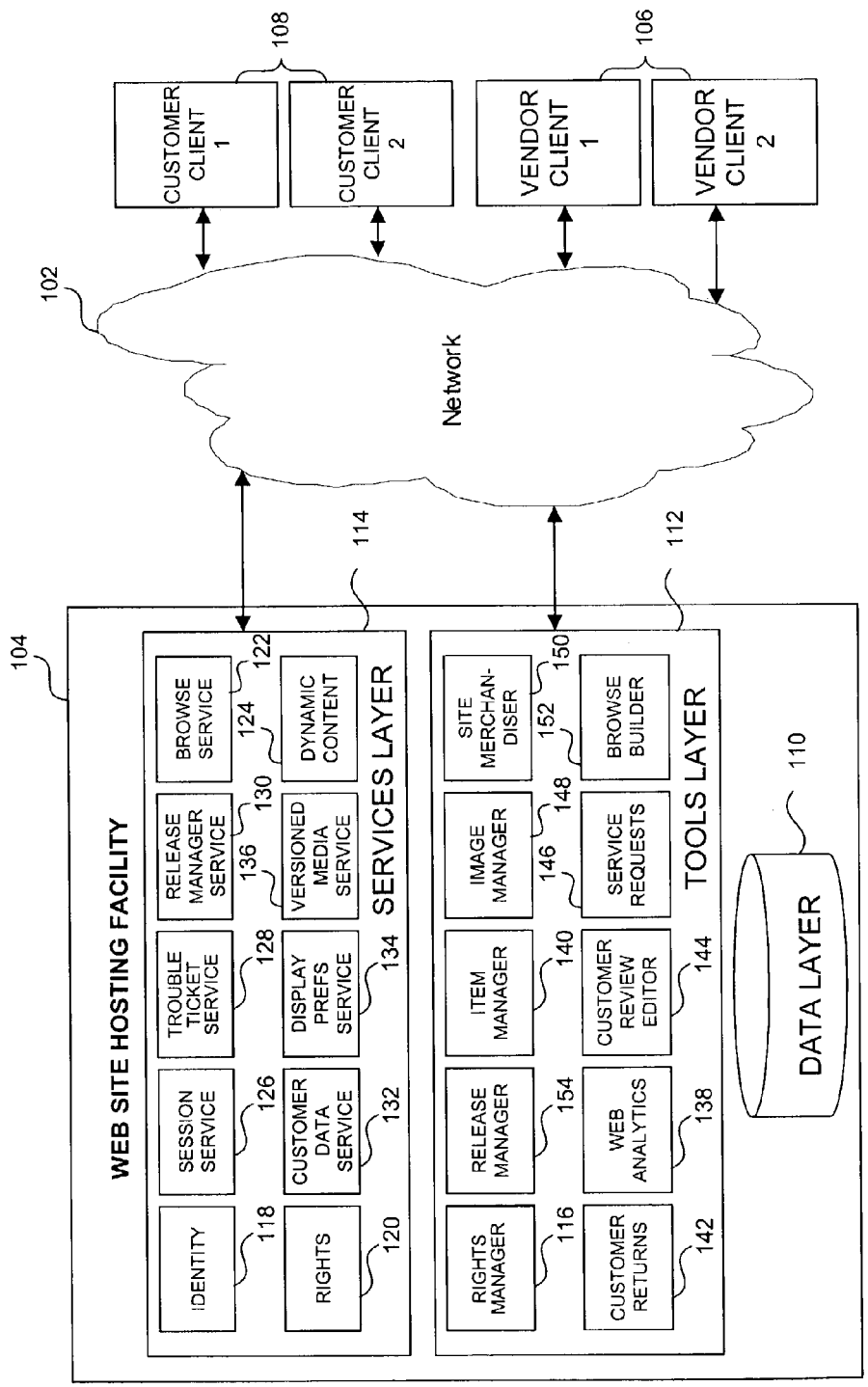
FIG. 1 is a high-level block diagram showing a typical environment in which the facility operates.

A facility for managing web site content and creating and reviewing revisions to web sites is provided. In some embodiments, the facility provides tools and services that allow users to create releases, each release comprising a set of changes to a web site. A user may schedule a particular release to be published to the live web site at a future specified time. In some embodiments, while the user is specifying changes for a new release, the provided tools and services may identify or otherwise show changes resulting from previously created, but yet-to-be-published (i.e., future) releases. For example, a user may create a release identified as Release J, which is scheduled to publish to the live web site at 7:00 a.m. on January 3. While specifying the changes for Release J using the provided tools, the user can preview the web pages that will be affected by Release J as they will actually appear after all existing future releases scheduled prior to 7:00 a.m. on January 3 are published.

In some embodiments, while a user is specifying changes for a new release using the provided tools/interfaces, the facility may flag or otherwise identify any problems or inconsistencies that may result when the new release and any existing future releases are ultimately published to the web site. For example, on November 14, a user may create a release identified as "Holiday Kickoff," which is scheduled to publish to the live web site at 2:00 a.m. on November 26. While specifying that one of the changes for the Holiday Kickoff release is the addition of a child browse directory that represents a "Santa Claus Books" product category, the user receives a warning message that the related parent browse directory (representing a "Children's Books" product category), will be deleted in a future release scheduled for November 20. Because the user is notified of the broken dependency, the user can make the necessary accommodations to prevent the Holiday Kickoff release from causing errors or other problems on the live web site upon its publication.

In some embodiments, the facility may provide a preview mode that allows a user, such as an administrative user or manager, to preview existing future releases beginning at some baseline. In some embodiments, the previewed information is presented in such a way such that any inconsistencies that were not previously identified may be easily identified so that they do not cause errors, broken dependencies, or other inconsistencies on the live web site when the releases ultimately publish. For example, on December 28, an administrator assigned to the task of approving all releases may select to preview Release M, which is scheduled to publish to the live web site at 12:00 p.m. on January 15. The facility may identify any future releases (e.g., releases A-L) that are scheduled to publish to the live web site prior to 12:00 p.m. on January 15. The facility may then display the changes of Release M as they will appear on the web site after all the changes associated with the identified future releases are applied to the web site. Additionally, the facility may provide indications of inconsistencies (e.g., broken dependencies) by showing warning messages or error messages when possible inconsistencies are present.

II. Facility Overview and Overall Architecture

FIG. 1 is a high-level block diagram showing a typical environment in which the facility operates. A network 102, such as the Internet or an intranet, may provide a connection between a web site hosting facility 104 and various vendor client 106 and customer client 108 computers. The web site hosting facility 104 consists of three high-level layers: a data layer 110, a tools layer 112, and a services layer 114. The data layer 110 provides data to the various services in the services layer 114 including web site content data, such as images, product information and customer information. The tools layer 112 allows vendor clients 106 to access a multitude of tools for creating, managing and updating web site content. The services layer 114 functions as an interface between the tools layer 112 and the data layer 110 as well as between the data layer 110 and customer clients 108. It will be appreciated that rather than have a single service that serves both customer and vendor clients, multiple instances of services may be provided to serve customer and vendor clients and provide redundancy in the event a service failure. Different instances of the same service may also be used to serve customer clients separately from vendor clients so that load and outages impacting one set of services does not affect the load and performance of the other set.

In some embodiments, the tools layer 112, the data layer 110 and the services layer 114 are configured to allow for simultaneous use by multiple customers and vendors. For example, the web site hosting facility 104 may upon request, simultaneously provide dynamic live web content to multiple customer clients 108. Likewise, the web site hosting facility 104 may provide accounts for multiple vendor clients 106, each vendor having its own unique web site or collection of web sites managed and implemented using the web site hosting facility 104. To prevent unauthorized access between vendors, the web site hosting facility 104 may include an access control tool, such as a rights manager tool 116, which, in conjunction with an identity service 118 and a rights service 120, can be used to manage vendor accounts and allow each vendor client 106 to specify various rights and permissions for its own account (e.g., designate administrators).

In some embodiments, the same services are used to provide live web site content for customer clients 108 and functionality for the tools layer 112. This ensures content consistency throughout the create-preview-publish cycle. Some of the specific services provided by the services layer 114 may include a browse service 122, a dynamic content service 124, a session service 126, a trouble ticket service 128, a release manager service 130, a customer data service 132, a display customer preferences service 134 and a versioned media service 136.

The various tools for creating and managing content may include the rights manager tool 116 (described above), a web analytics tool 138 (for generating reporting data for the web site), an item manager tool 140, a customer returns tool 142, a customer review editor 144 (for filtering, modifying and deleting customer product reviews) and a service requests tool 146. As described in greater detail with respect to FIGS. 5-12, the tools layer 112 may also include an image manager tool 148, a site merchandiser tool 150, a browse builder tool 152 and a release manager tool 154. While the illustrated embodiment specifies a collection of tools, any combination of various tools may be provided without departing from the scope of the invention.

A more detailed example of a typical environment in which the facility operates is described in U.S. patent application Ser. No. 10/427,709 (Pending), entitled MANAGING THE RELEASE OF ELECTRONIC CONTENT USING A TEMPLATE WITHOUT VERSION LOGIC, which was filled on Apr. 30, 2003, herein incorporated in its entirety by reference.

III. Creating and Managing Releases

Figure 2:
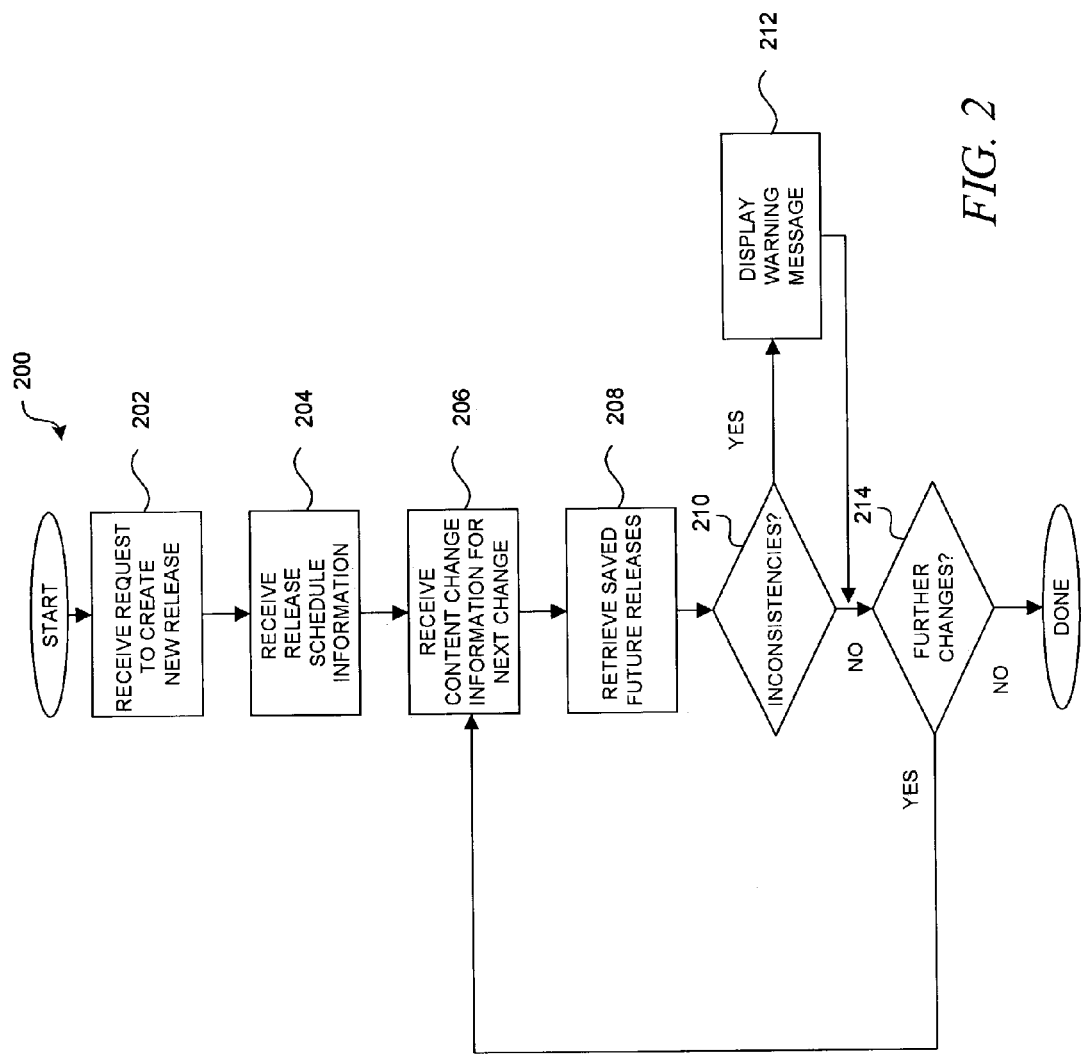
FIG. 2 is a flow diagram showing an example of a routine performed by the facility during creation of a release, where a warning message is displayed if a change associated with the release may result in a broken dependency when the release is published to a live web site.

FIG. 2 is a flow diagram showing an example of a routine 200 performed by the facility during creation of a release where a warning message is displayed if a change associated with the release results in a broken dependency when the release is published to the live web site. In block 202, the facility receives a request to create a new release. Receipt of this request causes the facility to prompt the user for release scheduling information. In block 204, the facility receives release scheduling information for the new release. The release scheduling information may include, for example, a date and time when the new release is to be published to the live web site. Once the facility receives release scheduling information, it is ready to begin receiving information associated with a set of changes specific to the new release. In block 206, the facility receives content change information associated with a first change for the new release. An interface for receiving this content change information may include one of the many tools associated with the tools layer 112 of FIG. 1, including the image manager tool 150, the browse builder tool 152 or the site merchandiser tool 150. For example, information or changes related to the browsing structure or hierarchy of a web site may be manipulated using the browse builder tool 152, as is shown, for example in FIG. 7, discussed below. Similarly, new product information and/or images may be added or organized to the web site using the site merchandiser tool 150 or the image manager tool 148, as shown, for example in FIG. 5 and FIGS. 6A and 6B, also discussed below.

In block 208, services associated with the facility retrieve release data for saved future releases. The routine continues at decision block 210, where the facility checks for inconsistencies between the change received for the new release in block 206 and the changes associated with the retrieved saved future releases associated with block 208. If inconsistencies are detected, the facility displays a warning message in block 212 via the tool/interface from which the user is working, as shown for example in FIG. 8, discussed below. If, however, in decision block 210 no inconsistencies are identified, the routine continues at block 214 after which, if there are no further changes, the routine ends. If, at block 214, there are further changes, the routine loops back to block 206 where it receives content change information for the next change associated with the new release.

Figure 3:
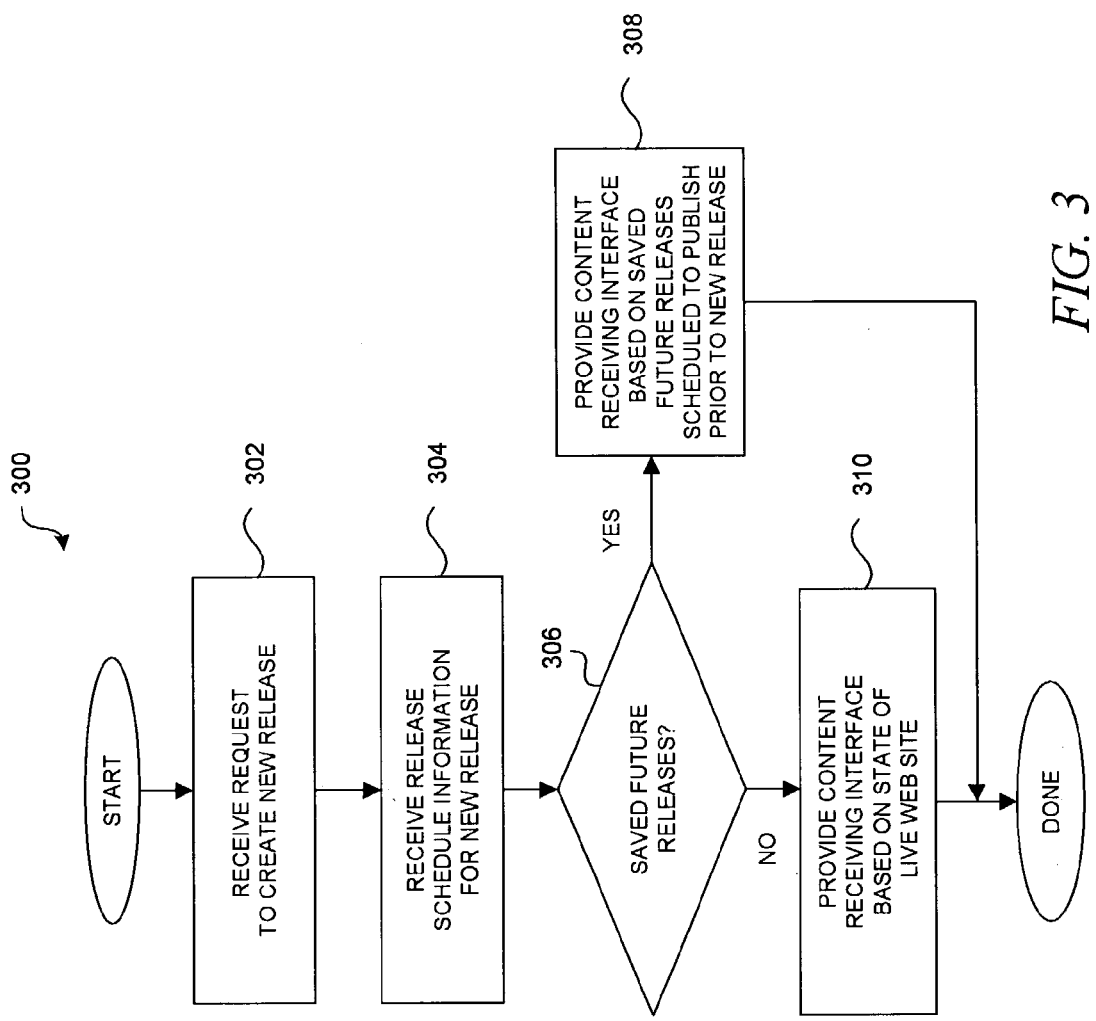
FIG. 3 is a flow diagram showing a second example of a routine performed by the facility where the facility displays a preview of future releases having a release date prior to the current release while a user is specifying changes for a current release.
Figure 9:
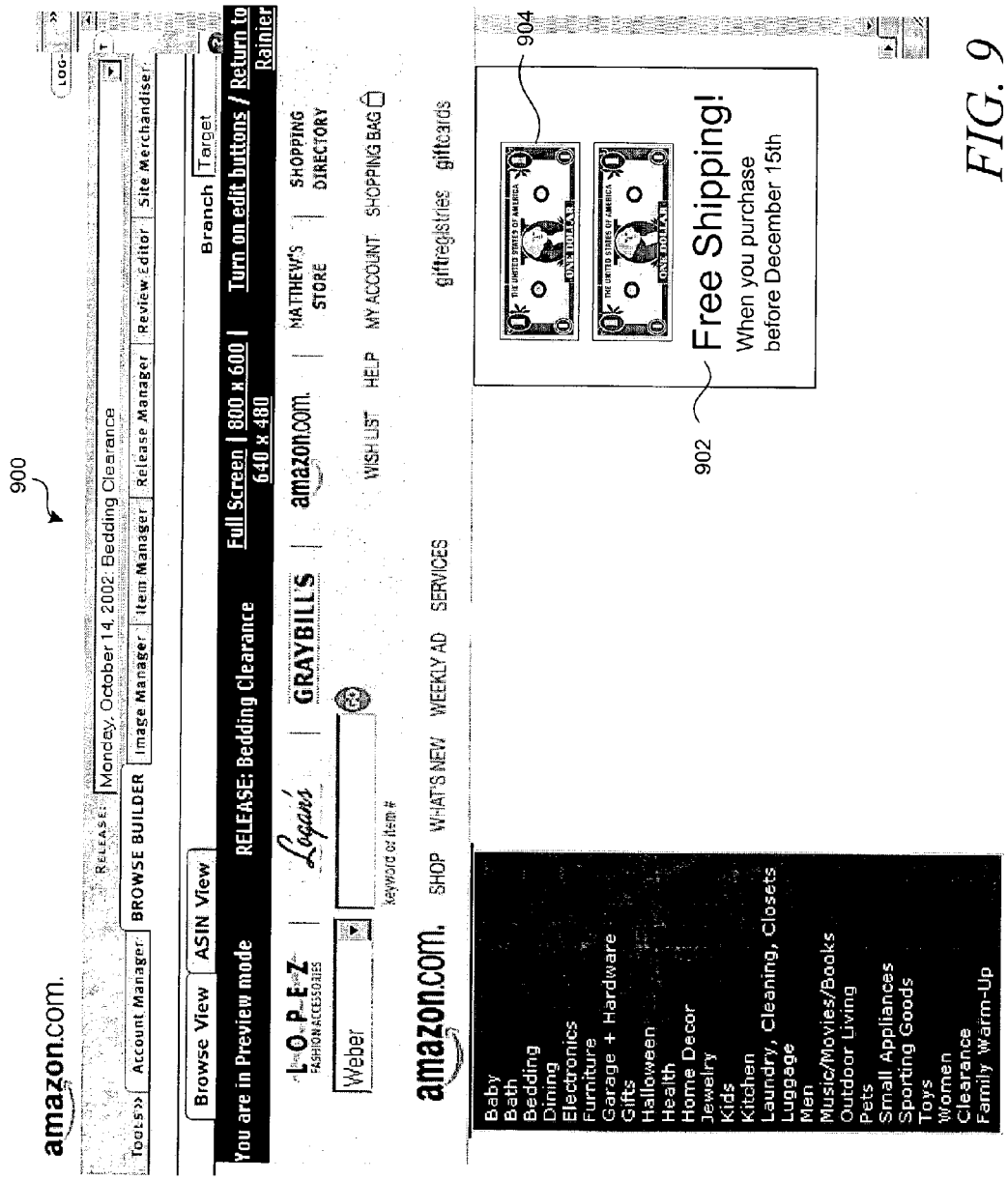
FIG. 9 is a display diagram showing an example of a content change tool/interface preview mode showing an inconsistency that may result when a specified change is ultimately published to a live web site.

FIG. 3 is a flow diagram showing a second example of a routine 300 performed by the facility where the facility displays a preview of future releases having a release date prior to a new release while a user is specifying changes for the new release. In block 302, the facility receives a request to create a release. In block 304, the facility receives release scheduling information for the new release. In block 306, the facility searches the database for information related to future releases that are saved on the system. If, in decision block 306, the facility identifies saved future releases, the routine then continues at block 308 where the facility provides an interface for receiving content change information that reflects the changes specified by the identified future releases. For example, the tool/interface being used to specify changes will show a confirmation/preview page that displays a browse structure as specified by future releases. In another example, upon specification of a change, the tool/interface may provide a preview mode showing the change applied in light of identified future saved releases, as shown in FIG. 9, discussed below. If in decision block 306 the facility does not identify any saved future releases, then the routine continues at block 310 where the facility provides a content change receiving tool/interface for the current release that is based on the state of the live web site. After block 310, or alternatively, block 308, the routine ends.

Figure 4:
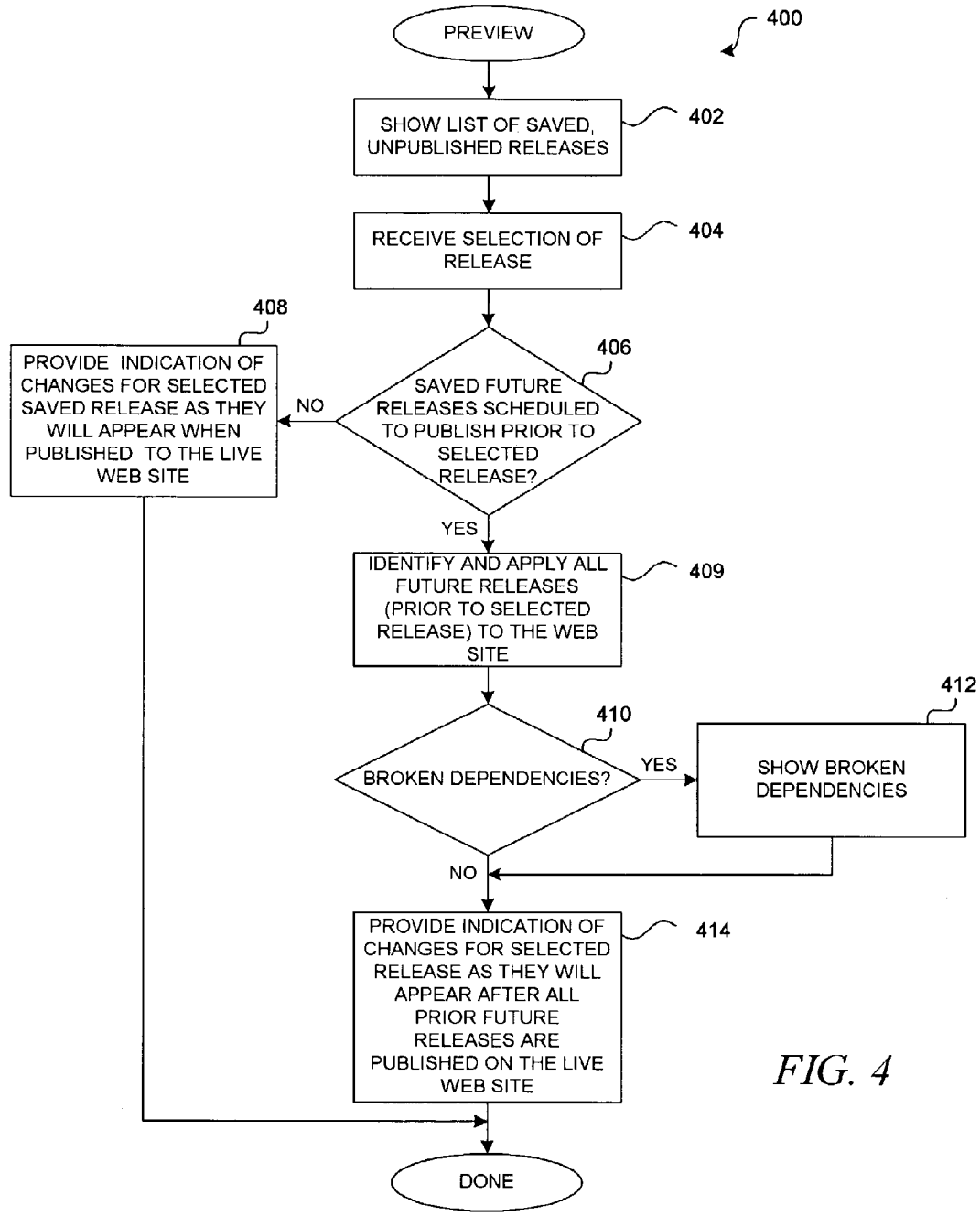
FIG. 4 is a flow diagram showing an example of a routine performed by the facility during preview of a scheduled release.
Figure 11:
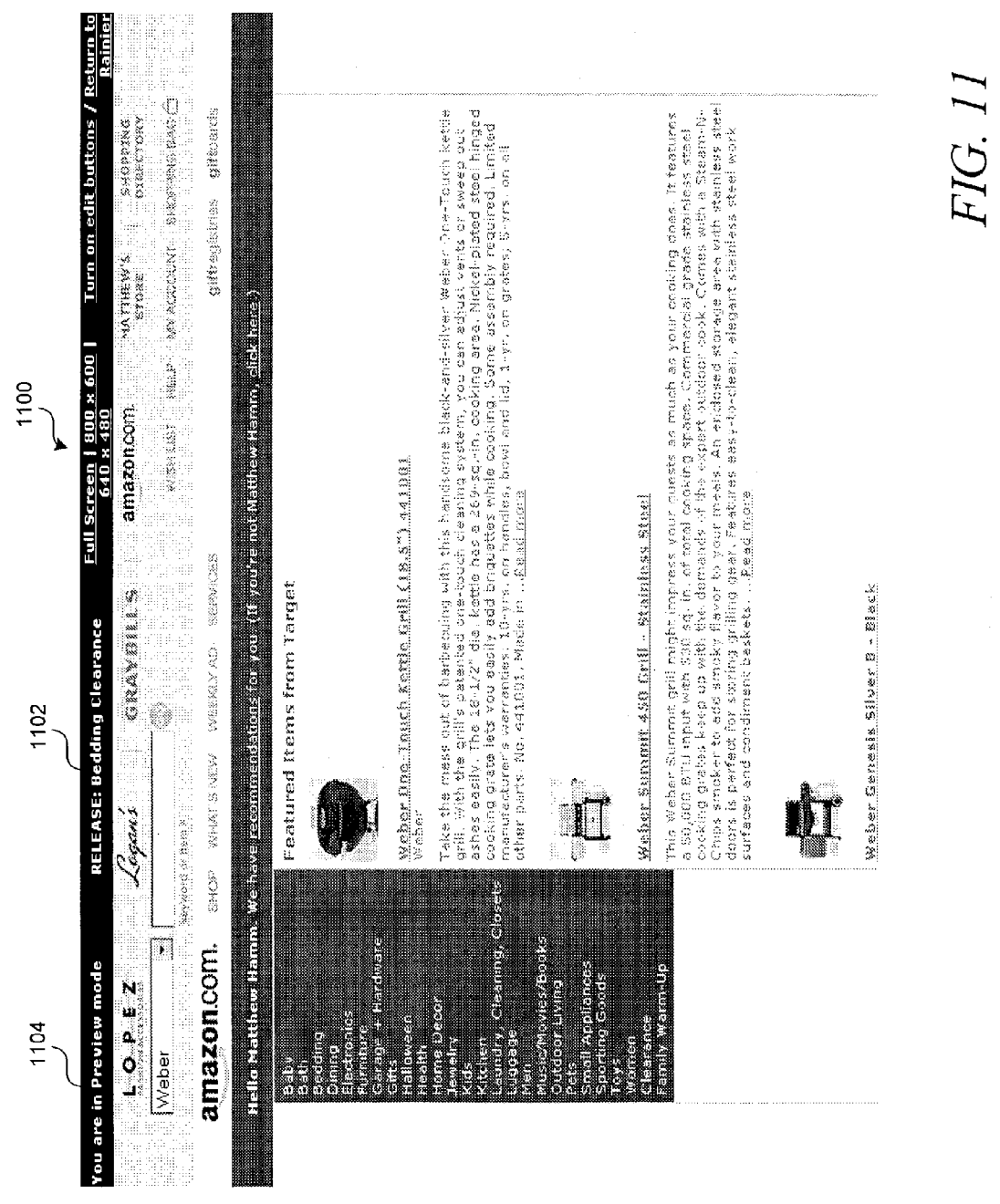
Figure 12:
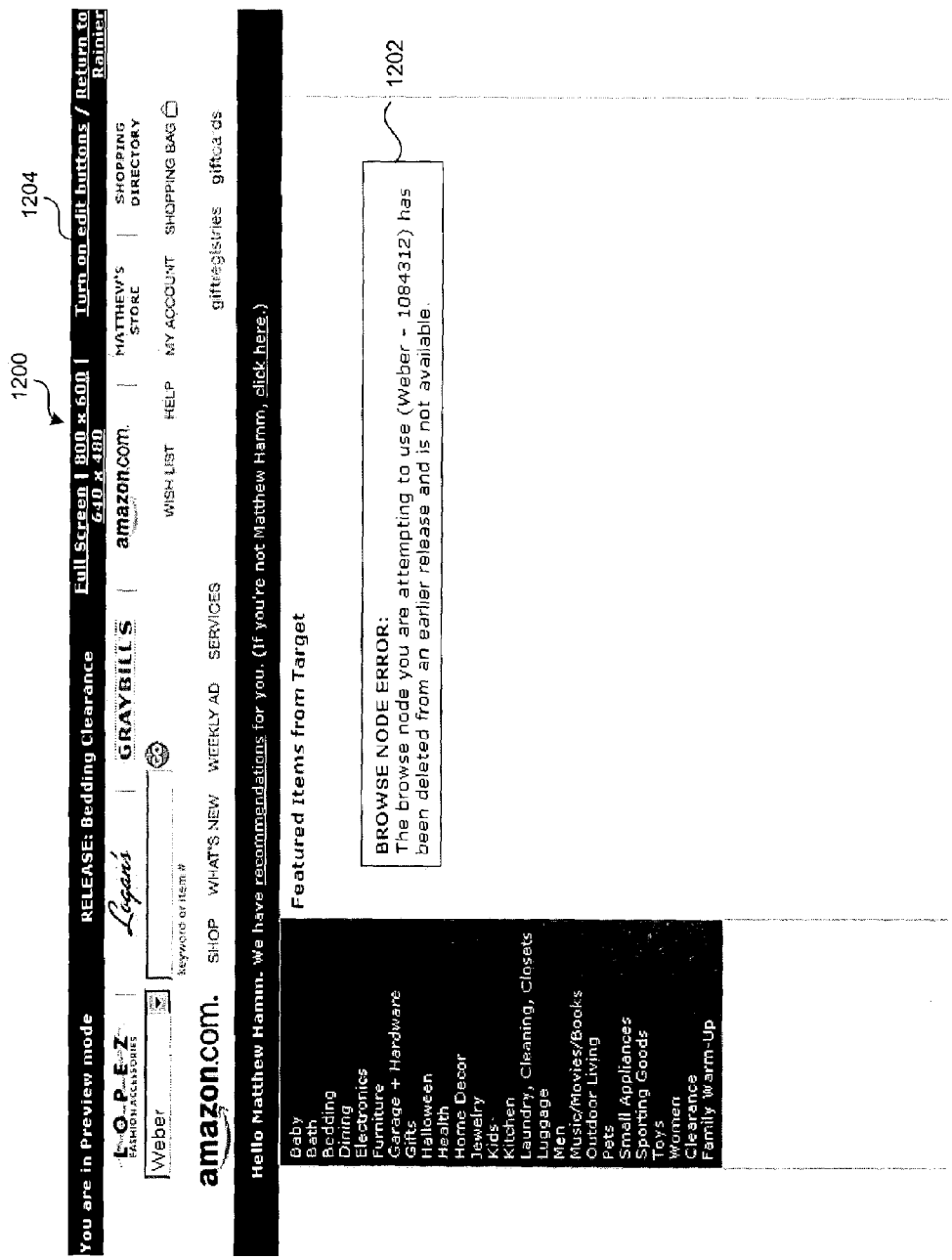
FIG. 12 is a display diagram showing an example of a web page preview for a change selected from the release report of FIG. 10 where an indication of a broken dependency is displayed.

FIG. 4 is a flow diagram showing an example of a routine 400 performed by the facility to preview a scheduled release. In one embodiment, the routine 400 may be executed when an administrative user wishes to view releases for purposes of quality assurance and/or approval. In block 402, the facility displays a list of saved future releases. In block 404, the routine receives a selection of one of the displayed future releases. In decision block 406, the routine checks for saved future releases scheduled to publish prior to the selected release. If, in decision block 406, the routine does not identify any saved future releases scheduled to publish prior to the selected release, then the routine continues at block 408 where the facility provides an indication of changes for the selected release as the changes will appear when published to the live web site. Examples of this are shown in FIGS. 11 and 12, discussed below. The routine then ends after block 408. If, however, in decision block 406 the facility does identify saved future releases that are schedule to publish prior to the selected release, the routine then continues at block 409 where the facility applies all of the identified future releases (prior to the selected release) to the website. At decision block 410 the facility identifies any broken dependencies that occur when the selected release is applied to the web site after all the identified future releases are applied to the live web site. If broken dependencies are not identified, the routine continues at block 414, where the facility provides a preview page that shows the changes for the selected release as the changes will appear after all identified future releases that occur prior to the selected release are published on the live web site. If at decision block 410 broken dependencies are identified, the routine will continue at block 412 where the facility shows indications of the broken dependencies. The routine will then continue at block 414 where it provides an indication of the changes for the selected release as the changes will appear after all prior saved future releases are published on the live web site. The routine then ends after block 414.

As described in FIG. 1 and its accompanying description, the tools layer 112 may have one or more visual user interfaces (called "tools") that allow a user to create and specify changes for content releases. Examples of such tools are described with respect to FIGS. 5-12. While only certain examples are given, a person skilled in the art would appreciate that many other tools/interfaces could be implemented without departing from the scope of the invention. The terms "screen," "window," and "page" are generally used interchangeably herein. The pages described herein may be implemented using, for example, XML (extensible markup language) or HTML (hypertext markup language) combined with scripts that provide information to a user. The web pages are stored and/or transmitted as display descriptions, graphical user interfaces or other methods of depicting information on a screen (whether computer, PDA, mobile telephone or other) where the layout and information or content to be displayed on the page is stored in a database or other storage facility. While aspects of the invention are described using a network environment, some or all features may be implemented within a single-computer environment.

Figure 5:
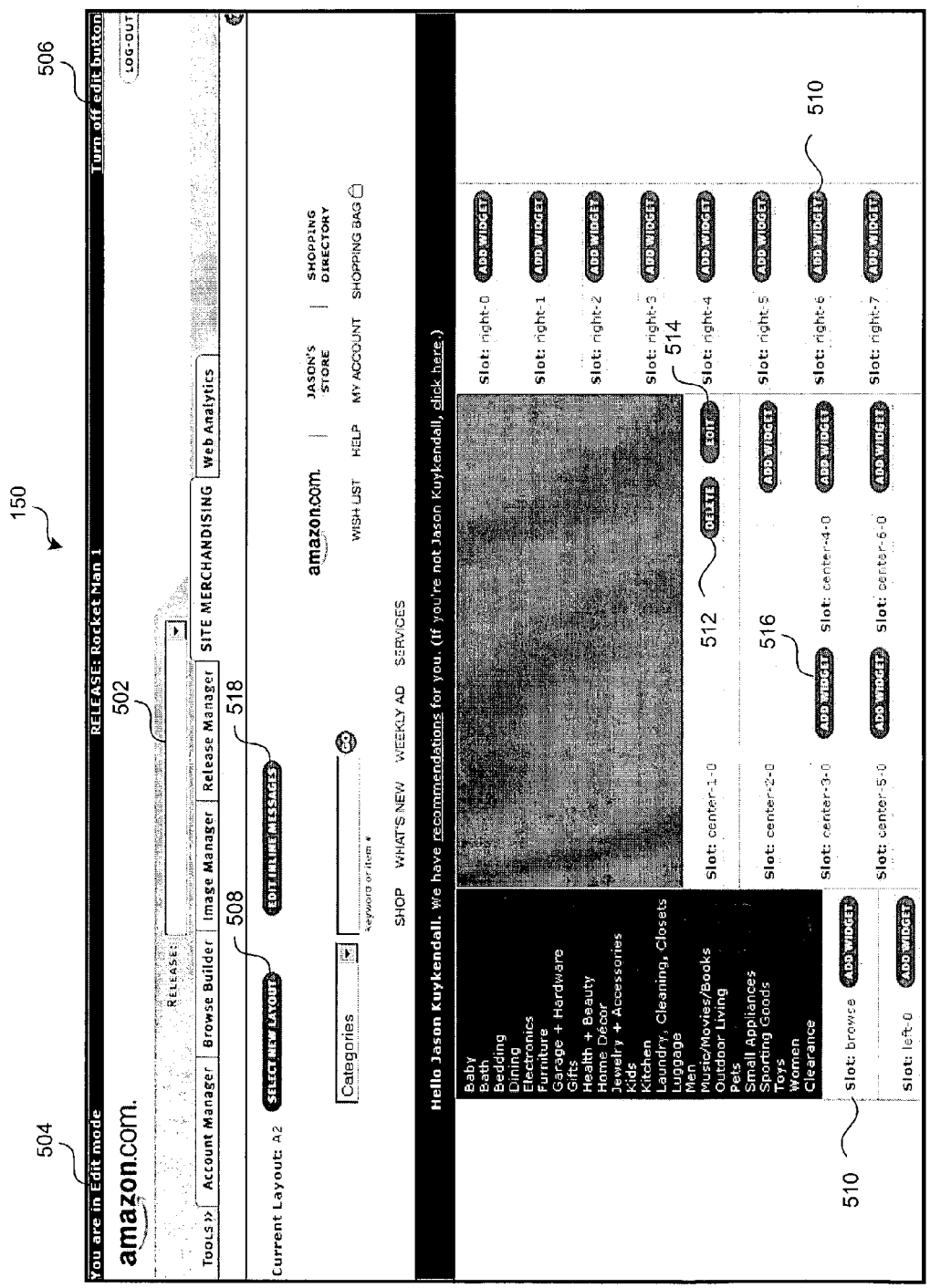
FIG. 5 is a display diagram showing an example of a site merchandiser tool/interface for organizing the display of products and product images on a web site.

FIG. 5 is a display diagram showing an example of a site merchandiser tool 150 for organizing the display of products and product images on a web site. The site merchandiser tool 150 provides the user with control over the way products are merchandised on the web site. Using this tool, the user can add, modify or delete text, product images, product pages, promotional content, web site navigational content—anything that appears on the web site. For example, the site merchandiser tool 150 may facilitate the placement of product and content on various pages of the web site (e.g., homepages, category pages and subcategory pages). In some embodiments, and as discussed in more detail below with respect to FIG. 9, the user can preview the web site as each change is made using a preview mode.

In the embodiment illustrated in FIG. 5, the site merchandiser tool 150 allows the user to make changes to the live web site "on the fly." If the user wishes to associate a set of changes with future release data, the user may begin by selecting a release using a RELEASE pull-down menu 502. Releases are identified either numerically (e.g., #1265), textually (e.g., July 4$^{th}$ Specials, Holiday Kickoff), or other combination. Once a specific release is selected, the page is updated with all previously stored releases up to and including the selected release, and the user may proceed with the changes. A status bar 504 displays the mode (i.e., preview vs. edit) that the user is currently in. The default mode for the illustrated embodiment is the edit mode. The user may switch modes by selecting the TURN OFF EDIT BUTTON link 506.

While in edit mode, the site merchandiser tool 150 may be used to create a new layout by selecting the SELECT NEW LAYOUT button 508, which causes a select new layout page (not shown) to appear. In some embodiments, once a layout is selected, details of the layout may be specified using a slot system, which divides each web page into slots 510. The user can then place information about a product, promotion or other content in each slot. The user can delete slots from the web page by selecting a DELETE button 512. The user can also edit the content of slots using the web site merchandiser tool 150 by selecting the EDIT button 514 next to the desired slot, which causes an edit slot page (not shown) to appear. During the editing process, various widgets (including images, text, sound, and other information) may be added to each slot. Widgets are added by selecting the ADD WIDGET button 516.

The site merchandiser tool 150 may also be used to edit any inline messages that appear on the web site (e.g., "Hello <customer name>. If you are not <customer name> click here."). The user may edit an inline message by selecting the EDIT INLINE MESSAGES button 518, which causes an edit inline message page (not shown) to appear. From the edit inline messages page, inline message content may be created, edited or deleted.

For each change made using the site merchandiser tool 150, a confirmation message (not shown) may be used to provide information so that the user can verify each change as soon as it is specified. As described in further detail below with respect to FIG. 7, in some embodiments, each confirmation message may be generated in light of future releases that are saved by the facility.

FIGS. 6A and 6B are display diagrams showing examples of an image manager tool 148 for organizing and uploading web site images ranging from web site graphics to individual product images. In some embodiments, a user can use the image manager tool 148 to upload and work with product images (i.e., images that support a specific product) by first selecting a PRODUCT IMAGES tab 602. The user may also use the image manager tool 148 to work with general images (e.g., web site logos, promotional images, navigation bars, etc.) by selecting a GENERAL IMAGES tab 604. Using various upload features, images may be uploaded individually or in batches. The user may check on the status of an image upload or image batch upload after submitting a request for upload by selecting an UPLOAD STATUS tab 608. Selection of the UPLOAD STATUS tab 608 may cause the display of a report showing a success/failure message for each upload request (not shown). As with changes specified using the site merchandiser tool 150, if the user wishes to associate a set of changes to an image with a specific future release, the user may begin by selecting a release using a RELEASE pull-down menu 610.

As shown in FIG. 6A, when working with general images, the user may search for images already uploaded in the system by entering a keyword or image name into a SEARCH field 612. This searching functionality is made possible by allowing users to specify keywords and names for general images as they are uploaded to the facility. Additionally, general images may be organized and accessed using customized directory structures. Similar functionality may or may not be provided with respect to product images. The image manager tool 148 may also list the vendor's top-level directories 614.

As shown in FIG. 6A, users can upload new general images and/or replace old images by selecting the UPLOAD TO THIS DIRECTORY button 616, which may cause an upload page (not shown) to appear in some embodiments. Users can create general image subdirectories by selecting a CREATE SUBDIRECTORY button 618, which may cause a create directory page (not shown) to appear. Similarly, general image subdirectories may be deleted using a DELETE THIS DIRECTORY button 620 or renamed using a RENAME THIS DIRECTORY button 622. Confirmation pages (not shown) may be used to confirm a request for image upload, directory creation/deletion and directory renaming.

As shown in FIG. 6B, when working with product images, the user may begin the process for uploading new product images for a specific product by selecting an UPLOAD PRODUCT IMAGE link 624. This may cause an upload page or dialog box (not shown) to appear, from which the user may browse for or specify a specific image to upload to the system. The user may also search for existing product images using the image manager tool 148. As illustrated in FIG. 6B, in a system using product identification numbers (e.g., ASINs), product images may be searched by entering a product identification number into a SEARCH field 626. In other systems, keywords or other search techniques may be employed.

Figure 7:
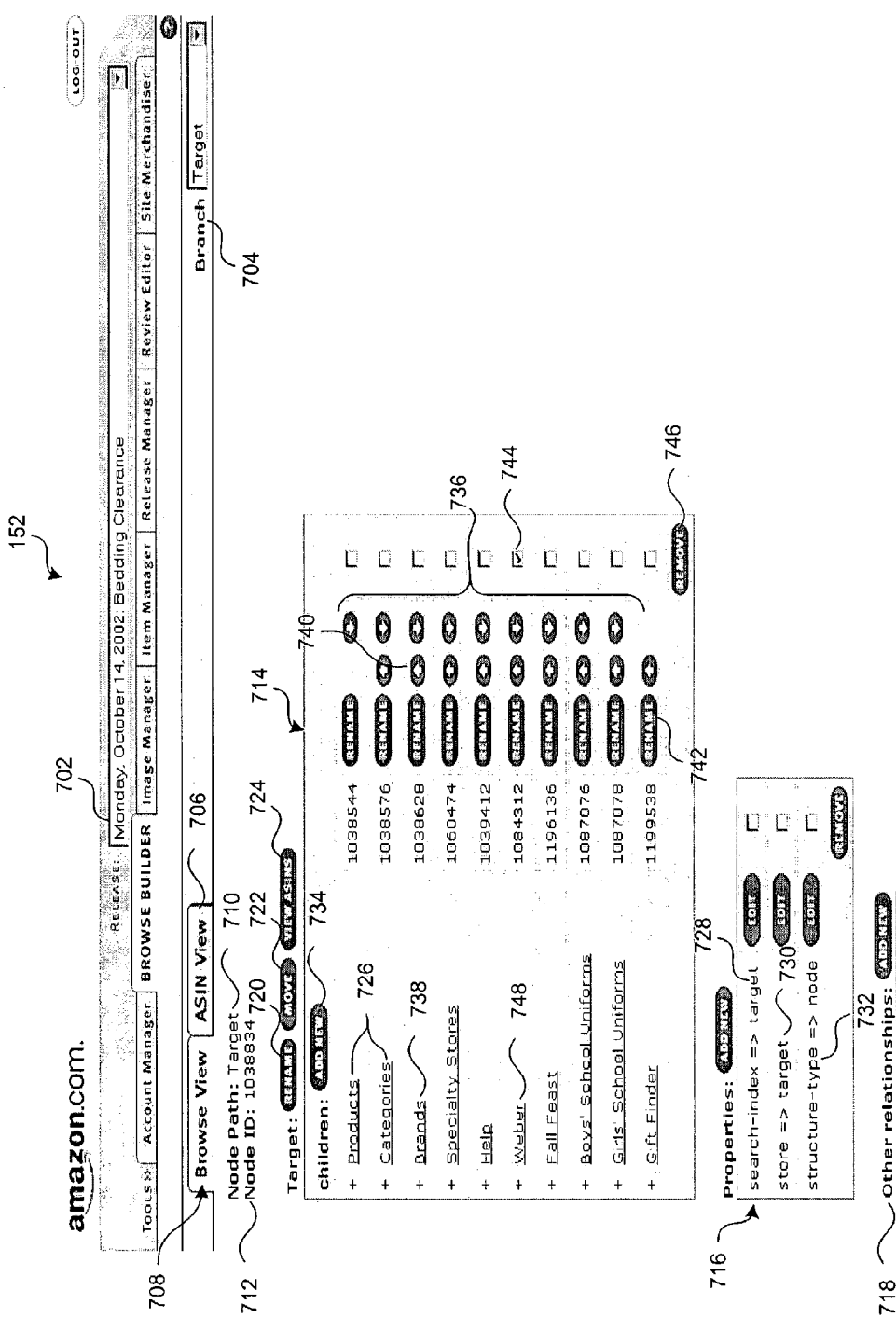
FIG. 7 is a display diagram showing an example of a browse builder tool/interface for changing the browse structure of a live web site.

FIG. 7 is a display diagram showing an example of a browse builder tool 152 for changing the browse structure of a web site. The browse structure of a web site may consist of various directories, arranged in a hierarchy or other organization. For example, the web site browse structure may be a hierarchical tree that consists of a top-level directory page (also known as the "root directory" or "root node"), one or more levels of child directories (also known as "sub-directories"), and a collection of product pages (the pages that contain the products themselves) which may or may not be represented as leaf nodes in the tree structure. The web site browse structure may also be a directed acyclic graph or other browse structure known in the art. In some embodiments, the browse builder tool 152 enables a vendor to build the navigation structure for its web site(s), giving the vendor full control of the site navigation. A user can use the browse builder tool 152 to assign product entries to specific pages.

The browse builder tool 152 of the embodiment illustrated in FIG. 7 has two sub views: a product identification number (e.g., ASIN) view 706, from which the user can view all the products associated with a selected directory and add additional products to a directory, and a browse view 708, from which the user can view, rename, and move all directories on the web site.

To change or modify the browse structure of a web site, the user begins by selecting a release. A release may be selected using the RELEASE pull-down menu 702. Once the release is selected, if a vendor has multiple storefronts, the user will select the storefront or branch it wants to edit by selecting that branch in the BRANCH pull-down menu 704. If, however, the vendor's account is a single-storefront account, the BRANCH pull-down menu 704 may not appear. Instead, the user may be taken directly to a browse view that displays information about the root directory node of the vendor's web site.

While using the browse view 708, the selected directory/ node may be identified using a NODE PATH field 710 and a NODE ID field 712. The children of the identified directory/node are displayed in a CHILDREN field 714 and the properties of the selected directory/node are displayed in a PROPERTIES field 716. In some embodiments, other browse-structure-related relationships may be defined using an OTHER RELATIONSHIPS field 718.

In some embodiments, selecting a RENAME button 720 may cause the display of a rename dialog box or page (not shown) from which a user can rename the selected directory. Similarly, the user may select a MOVE button 722 to reorder a selected directory by reassigning it to be the child of a new parent. By selecting a VIEW ASINS button 724 or the ASIN view tab 706, the user may view all products associated with a selected directory. The user may also be able to manipulate child directories associated with the selected directory using the CHILDREN field 714. The CHILDREN field 714 may display a list of the sub-directories associated with the selected parent directory. In some embodiments, certain child directories may be associated with their own sets of children. Where this is the case, the name of each child directory 726 may be a link to another browse view page in which the selected child directory is identified as a parent directory having its own set of children.

From the browse view page 708, the properties of a directory may be specified or modified. Examples of properties for a directory include a search index 728 for the directory, a store name 730 for a directory and a structure type 732 for the directory (e.g., node).

From the browse view page 708, new children may be added to the selected directory by selecting the ADD NEW button 734. In some embodiments, selecting the ADD NEW button 734 takes the user to a new browse view page (not shown) from which the user can specify the information for the new child directory. The children of the selected directory may also be reordered using a set of arrow buttons 736. Ordering the children in this way allows the user to specify the order that the child directories will be listed on the live web page. For example, if the user wishes to display a "Brands" child directory 738 at the top of the list, the user will select the upward facing arrow button 740 associated with the "Brands" child directory until the "Brands" child directory 738 reaches the top of the list. The user can also rename each child directory by selecting a corresponding RENAME button 742. As with the ADD NEW button 734, selection of the RENAME button 742 may cause a new browse page (not shown) to appear from which the user can specify the new name. To remove a child directory, the user selects a check box 744 associated with the desired child directory and selects the REMOVE button 746. In some embodiments, if the user makes changes using any of the features described above, a confirmation page may be displayed verifying the change. The use of confirmation pages is described in more detail below with respect to FIG. 8.

For any selected release, the child directories and the products displayed for a selected directory is determined based on the status of the web site in its current live state as modified in light of the set of future releases that are scheduled to occur prior to the time of the selected release. The browse builder tool 152 and similar tools such as the site merchandiser tool 150 of FIG. 5 are therefore configured to provide an accurate portrayal of the web site as of the date the user intends to modify the site, whether that date is the current "live" web site or a future release of the web site. For example, if the time for the selected release is 6:00 a.m. on July 1, the list of displayed child directories 714 shown in the browse builder tool 152 will include a child directory that is scheduled to be added to the browse structure on June 29.

Figure 8:
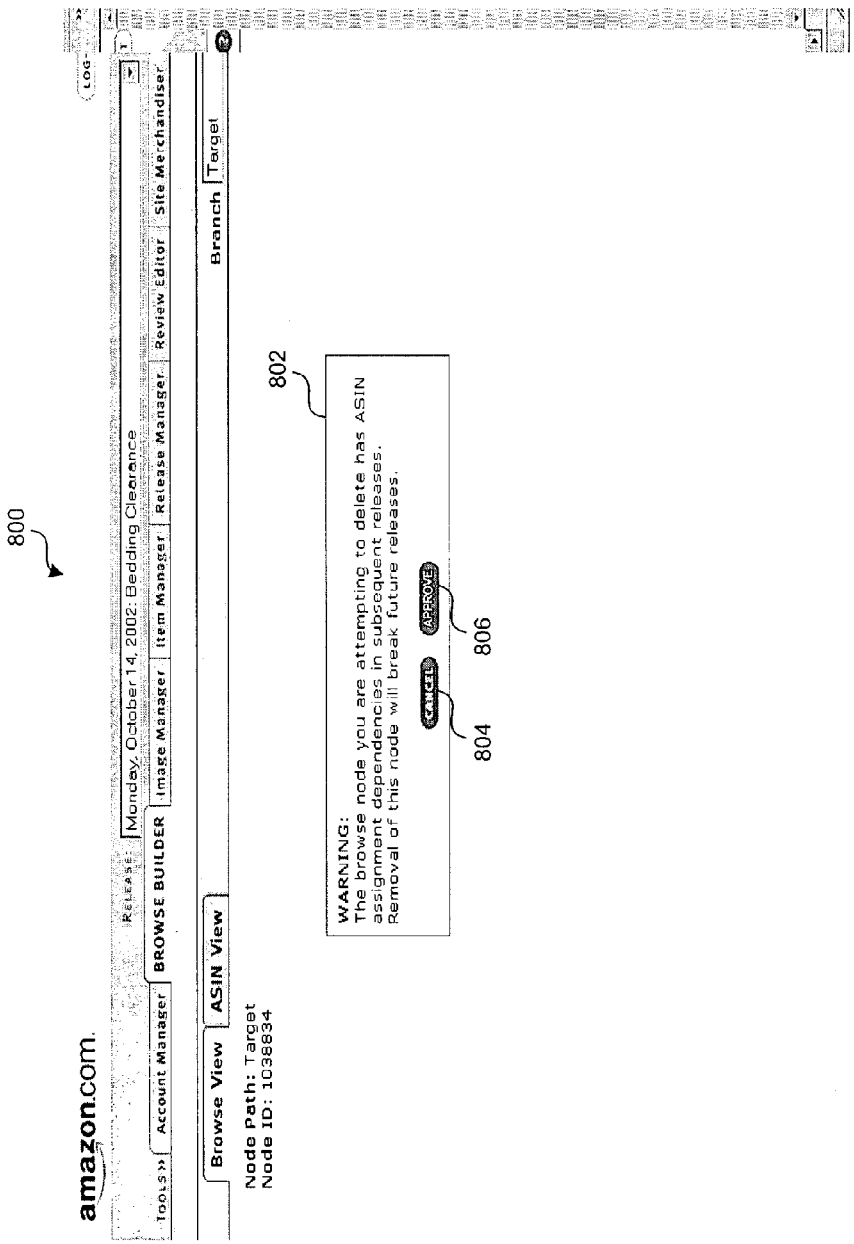
FIG. 8 is a display diagram showing an example of a browse builder confirmation page displaying an example of a warning message.

In some embodiments, when changes are made to a directory using the browse builder tool 152, or to the layout or contents of a page using the site merchandiser tool 150, a confirmation page may be displayed. The confirmation page is used to warn of any possible future inconsistencies that occur when the change is applied to the web site in light of a set of future releases. As shown in FIG. 8, when a current change being made by the user creates a problem (such as a broken link or other error) with a change made in a future release, an indication of this problem may be displayed in a warning message 802. In this example, the confirmation page is generated based on a request to delete the "Weber®" child directory 748 of FIG. 7 from the listed child directories 714 associated with the "Target®" parent directory 710. As the warning message 802 indicates, the facility has identified a future release that contains a change that is dependent on the "Weber" directory 748. Here, the dependent change assigns a new product (e.g., a new grill model) to the Weber directory 748. In this case, when the release specifying the dependent change is scheduled to occur after the release associated with the confirmation page, the change results in an inconsistency or an undesired effect on the web site once the dependent future release is published. By providing the warning message, the user is made aware of the potential problem and is given the option of either canceling the change by selecting the CANCEL button 804, or proceeding with the change by selecting the APPROVE button 806. If the user approves of the change, an error on the web site may ultimately occur unless the user corrects the web site prior to the release that results in a broken link in the future. In some embodiments, multiple warning messages may be displayed on a single confirmation page, such as when a change breaks multiple links in the future.

In addition to or as an alternative to displaying a confirmation page for a change, a user using the browse builder tool 152 or another content release tool may be able to preview the effects of a change using a special preview mode associated with the corresponding tool. As shown in FIG. 9, by using this special preview mode, a user may become aware of more subtle problems associated with the change as applied to the web site in light of future releases. This can be especially helpful in identifying problems that are not automatically detected by the facility.

FIG. 9 is a display diagram showing an example of a content release tool preview mode 900 showing an inconsistency that may result when a requested change is ultimately published to the live web site. This type of preview mode may be available while working in a tool such as the site merchandiser tool 150 of FIG. 5. In this example, the live web site may currently advertise for discount shipping by displaying an image of a delivery truck (not shown) along with the text "TWO-DOLLAR SHIPPING ON ALL ITEMS" (not shown). The requested change deletes the text "TWO-DOLLAR SHIPPING ON ALL ITEMS" and replaces it with the text "FREE SHIPPING!" 902. However, because an identified future release includes a change that deletes the image of the delivery truck and substitutes an image of two one-dollar bills 904, the published web site will contain conflicting information that may confuse customers, i.e., two one-dollar bills next to the free shipping message. By providing an indication of the inconsistency, the preview mode 900 allows the user to address the problem at the earliest possible time.

Figure 10:
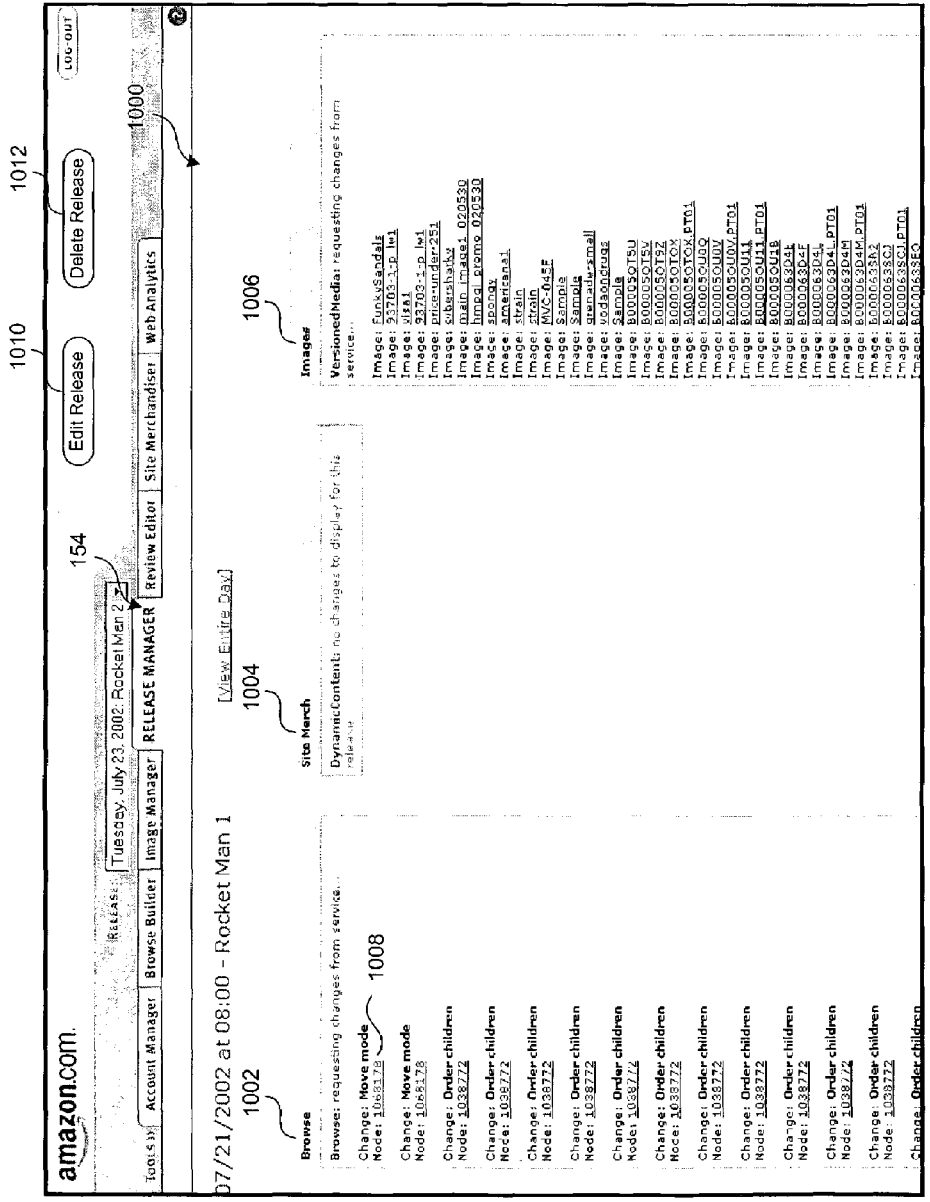
FIG. 10 is display diagram showing an example of a release report displayed by a release manager tool/interface.

FIG. 10 is display diagram showing an example of a release report 1000 generated by a release manager tool 154. Although not shown in the illustrated embodiment, the release manager tool 154 may be used to create a release (e.g., by providing a name for the release, a time for the release, and a date for the release) and for quality assurance (i.e., to preview and approve/disapprove saved releases). The release report 1000 may be used to identify all changes associated with a selected release. However, one skilled in the art would appreciate that other change identification techniques may be used without departing from the scope of the invention. The changes identified in the release report may be organized according to the tool used to create the change. Accordingly, the example in FIG. 10 displays changes made using a browse tool 1002, a site merchandiser tool 1004, and an images tool 1006. In this example, each change has a corresponding link 1008 that may be selected to view a preview of the page or pages affected by the release. Thus, from the release report page 1000, the user/administrator can be taken to a preview page associated with each change, such as the preview pages of FIGS. 11 and 12. Additionally, from the release report page 1000, the release may be edited by selecting an EDIT RELEASE button 1010. A release may also be deleted from the facility by selecting a DELETE RELEASE button 1012.

The release manager report page may also be used to approve a selected release by using an APPROVAL button (not shown). In some embodiments, such as the illustrated embodiment, however, the APPROVAL button is not displayed on the report page 1000 until after the release has been previewed using preview pages such as the preview pages of FIGS. 11 and 12.

One skilled in the art would appreciate that the release tool may be used to perform other functions related to releases. For example, it is possible to configure the release tool to allow administrators to block out windows of time where users cannot schedule new releases (e.g., during customer peak times or holidays. Similarly, administrators may be allowed to associate particular release times or tools with particular users, etc.

FIG. 11 is a display diagram showing an example of a preview page 1100 for a change selected from a release report viewed using a release manager tool 154, such as the release report 1000 of FIG. 10. The name 1102 of the release is displayed at the top of the page. An indication that the user is in preview mode 1104 is also displayed. The preview page of FIG. 11 previews a change in which the user added a new product to a product directory (using, for example, the browse builder tool 152 of FIG. 7). To confirm that the page will appear as desired on the published web site in light of other future releases, the facility will generate the preview page 1100 by first applying, in chronological order, any changes contained in future releases, beginning with future releases at some baseline (typically the current live website) and ending with the future release scheduled just prior to the selected release. The facility will then complete the preview page by applying the change for the selected release.

In FIG. 11, the web page does not display any warning messages and appears normal. Accordingly, the user viewing the preview page 1100 can rest assured that in light of all existing future release, the web page will appear as desired.

FIG. 12 is a display diagram showing an example of a web page preview 1200 for a change selected from the release report of FIG. 10, where the facility has identified broken dependency when the selected change is applied in light of other future releases. As shown, the warning message 1202 indicates that a required browse node has been removed in a prior future release. In the face of such a problem, or if the user wishes to edit the request for some other reason, in some embodiments, the user may be permitted to edit the change directly from the preview page by selecting a TURN ON EDIT BUTTONS link 1204. In some embodiments, multiple warning messages may be displayed on a single preview page.

IV. Conclusion

It will be appreciated by those skilled in the art that the above-described facility and associated methods may be straightforwardly adapted or extended in various ways. For example, various combinations of tools and services may be employed by the facility, including tools and services not listed or described above. Similarly, various preview and/or confirmation mechanisms not described above may be implemented, such as preview emails, preview scheduling and forced preview just prior to release. Moreover, the system and method disclosed herein has broad applicability outside the scope of content or content management systems. For example, the techniques for managing releases may be used in any system wherein there are data dependencies between changes made in applications and synchronized via a common vehicle. While the foregoing description makes reference to preferred embodiments, the scope of the invention is defined solely by the claims that follow and the elements recited therein.

We claim:

1. A method in a computer system for specifying changes to a web site, the method comprising:

in the computer system, receiving a request for a first change to the web site, the first change scheduled for release at a first specified time;

in the computer system, receiving information for the first change;

prior to the specified time for release of the first change, in the computer system, receiving a request for a second change to the web site, the second change scheduled for release at a second specified time;

in the computer system, applying the first change and the second change in a preview page environment associated with the web site to automatically determine whether the release of the second change would result in an inconsistency once both the first change and the second change are released; and where the release of the second change would result in an inconsistency, in the computer system, providing an indication of the inconsistency.

2. The method of claim 1 wherein the first change is scheduled for release prior to the second change.

3. The method of claim 1 wherein the second change is scheduled for release prior to the first change.

4. The method of claim 1 wherein the requests for change are made using a tool for specifying the display of products on the web site.

5. The method of claim 1 wherein the requests for change are made using a tool for specifying the browsing structure of the web site.

6. The method of claim 1 wherein the requests for change are made using a tool for adding images to the web site.

7. The method of claim 1 wherein the requests for change are made using a tool for adding new products to the web site.

8. The method of claim 1 wherein the indication of the inconsistency is a warning message.

9. The method of claim 1 wherein the inconsistency is a broken dependency.

10. The method of claim 1 wherein the first change is scheduled for release prior to the second change and wherein the first change is a deletion of a parent browse node and the second change is an addition of a child browse node to the parent browse node deleted by the first change.

11. The method of claim 1 wherein the second change is scheduled for release prior to the first change and wherein the first change is an is an addition of a child browse node to a parent browse node and the second change is a deletion of the parent browse node.

12. The method of claim 1 wherein the first change is scheduled for release prior to the second change and wherein the first change is a modification of an image and the second change is a modification of a textual description associated with the modified image.

13. The method of claim 1 wherein the determining includes:

retrieving data associated with the first change according to a process for generating the web site as specified by the first change; and analyzing the second change to determine if data associated with the second change is consistent with the retrieved data.

14. In a system for releasing new content on a live web site, a method comprising:

providing an indication of saved releases, each of the saved releases scheduled for future release at a specified time;

receiving a selection of at least one of the saved releases to preview;

generating a preview of the at least one selected saved release, wherein generating the preview includes:

automatically identifying one or more saved releases scheduled to occur prior to the selected saved release;

automatically determining changes to a page of the web site that will occur after the identified saved releases and the selected saved release are applied to the web site in chronological order;

applying the determined changes to at least one preview page that provides a simulation of how the live web site will appear after the identified saved releases and the selected saved release are applied; and displaying the at least one preview page.

15. The method of claim 14 further comprising:

where there is an inconsistency between the changes in the selected saved release and the identified saved releases, identifying the inconsistency; and providing an indication of the inconsistency on the displayed resulting page of the web site.

16. The method of claim 15 wherein the indication of the inconsistency is a warning message displayed with information related to the inconsistency.

17. The method of claim 15 wherein the indication of the inconsistency is a warning message displayed on the resulting page of the web site.

18. The method of claim 15 wherein the indication of the inconsistency is displayed on a preview page, wherein the preview page is generated using a single code path, and wherein the single code path used to generate the preview page is also configured to generate the live web site after the selected release is scheduled to occur.

19. The method of claim 15 wherein the indication of the inconsistency is displayed on a preview page, wherein the preview page is generated using data, and wherein the data used to generate the preview page is also configurable to generate the live web site after the selected release is scheduled to occur.

20. The method of claim 14 wherein the indication of saved releases are provided in a report, the report indicating each change associated with the selected saved release.

21. The method of claim 14 including providing an option to approve the selected saved release.

22. The method of claim 14 including providing an option to modify the selected saved release.

23. The method of claim 14 including providing an option to modify the identified saved releases.

24. The method of claim 14 wherein the selected release includes deletion of a browse node.

25. The method of claim 14 wherein the selected release includes addition of a browse node.

26. The method of claim 14 wherein the selected release includes addition of a product description.

27. The method of claim 14 wherein the selected release includes addition of an image.

28. The method of claim 14 wherein the selected release includes addition of a product-specific image.

29. The method of claim 14 wherein the selected release includes a selection of a page layout.

30. The method of claim 14 wherein the selected release includes addition of non-product-specific content.

31. The method of claim 14 wherein the selected release includes addition of automated content.

32. The method of claim 14 wherein the selected release includes deletion of web site content.

33. A system for releasing new content on a web site, the system comprising:

means for providing an indication of saved releases, the saved releases scheduled for future release at a specified time;

means for receiving a selection of a saved release;

means for identifying saved releases scheduled to occur prior to the selected saved release; and means for generating a report, the report indicating each change associated with the selected saved release, and for each change, providing a link to a preview page, the preview page providing a simulation of how the web site would appear if the identified saved releases and the selected saved releases were applied to at least one page of the web site in chronological order.

34. A computer-readable medium whose contents cause a computing system to provide services for creating content changes for a web site, by a method comprising:
   receiving a request for a first release, the first release scheduled for release at a first specified time;
   based on the received request for a first release, providing at least one tool for receiving information for the first release;
   receiving information for the first release via the provided at least one tool;
   prior to the specified time for the first release, receiving a request for a second release, the second release scheduled for release at a second specified time, wherein the second specified time occurs after the first specified time;
   based on the request, providing the at least one tool for receiving information related to the second release, the at least one tool providing an indication of the received information for the first release; and
      after receiving the information related to the second release, applying the first change and the second change in a preview page environment associated with the web site to automatically determine whether performance of the second release would result in an inconsistency once both the first release and the second release are performed.

35. The computer-readable medium of claim 34 wherein the at least one tool includes a tool for adding product descriptions to the web site.

36. The computer-readable medium of claim 34 wherein the at least one tool includes a tool for adding images to the web site.

37. The computer-readable medium of claim 34 wherein the at least one tool includes a tool for adding product-specific images to the web site.

38. The computer-readable medium of claim 34 wherein the at least one tool includes a tool for selecting a page layout for the web site.

39. The computer-readable medium of claim 34 wherein the at least one tool includes a tool for creating non-product-specific content for the web site.

40. The computer-readable medium of claim 34 wherein the at least one tool includes a tool for scheduling automated content for the web site.

41. The computer-readable medium of claim 34 wherein the at least one tool includes a tool for specifying a browsing structure for the web site.

42. The computer-readable medium of claim 34 wherein the method further comprises:
   retrieving stored data objects associated with the first release.

43. The computer-readable medium of claim 34 wherein the indication of the inconsistency is a warning message.

44. The computer-readable medium of claim 34 wherein the indication of the indication of the inconsistency is presented on a preview page of the web site showing changes that will result when the first release and the second release is published to the live web site.

45. The computer-readable medium of claim 34 wherein the first release includes a deletion of a browse node and the second release includes an addition of a child browse node to the browse node deleted in the first release.

46. The computer-readable medium of claim 34 wherein the first release includes a deletion of a browse node and the second release includes an addition of new or modified product information, wherein the product information is related to the browse node deleted in the first release.

47. A computer-readable medium containing a data structure for use in a system for modifying content on a web site, the data structure including, for each of a plurality of releases, a release specification comprising:
   a scheduled release time; and
   an indication of a composite of data stored in a data store and managed by a plurality of release services, the composite of data corresponding to a set of changes to be made to the web site at the scheduled release time and providing a specification for generating a preview page using the plurality of release services, wherein the preview page provides a simulation of how the web site would appear if the set of changes associated with each of the plurality of releases with a scheduled release time that occurs on or before a specified time was applied to the web site.

48. The computer-readable medium of claim 47 wherein for each of the plurality of releases, the indication of composite data provides a specification for generating a live web page at the corresponding scheduled release time, the live web page generated using the plurality of release services.

49. The computer-readable medium of claim 47 wherein the preview page is configured to identify inconsistencies between changes in a selected release and a baseline.

* * * * *